United States Patent [19]

Siebert

[11] Patent Number: 4,976,811

[45] Date of Patent: Dec. 11, 1990

[54] APPARATUS FOR SEALING FILM INCLUDING SEALING HEAD WITH WEDGE-SHAPED LOWER-PORTION

[75] Inventor: Lester D. Siebert, Carbondale, Ill.

[73] Assignee: Com-Pac International, Inc., Centralia, Ill.

[21] Appl. No.: 217,854

[22] Filed: Jul. 12, 1988

[51] Int. Cl.⁵ .......................... B29C 65/10; B29D 5/10
[52] U.S. Cl. .......................................... 156/66; 156/82; 156/497; 156/498; 156/554; 383/65
[58] Field of Search ................. 156/66, 497, 498, 499, 156/500, 554, 82, 583.8; 383/65; 493/214, 215, 381, 927

[56] References Cited

U.S. PATENT DOCUMENTS

| | | | |
|---|---|---|---|
| 2,474,035 | 6/1949 | Crandon | 156/285 |
| 2,990,875 | 7/1961 | Samuels et al. | 156/251 |
| 3,239,402 | 3/1966 | Ecklund et al. | 156/497 |
| 3,318,744 | 5/1967 | Hurley | 156/497 |
| 3,402,089 | 9/1968 | Seaman | 156/497 |
| 3,488,244 | 1/1970 | Lepisto | 156/499 |
| 3,496,049 | 2/1970 | Anderson | 156/497 |
| 3,720,565 | 3/1973 | Cavanna | 156/497 |
| 3,846,209 | 11/1974 | Howard . | |
| 3,847,711 | 11/1974 | Howard . | |
| 3,980,515 | 9/1976 | Reil et al. | 156/497 |
| 3,986,914 | 10/1976 | Howard . | |
| 3,988,184 | 10/1976 | Howard . | |
| 4,155,800 | 5/1979 | Wilson | 156/497 |
| 4,308,087 | 12/1981 | Johnson | 156/308.4 |
| 4,384,914 | 5/1983 | Mattiebe | 156/499 |
| 4,498,939 | 2/1985 | Johnson | 156/66 |
| 4,601,694 | 7/1986 | Ausnit | 493/213 |
| 4,629,524 | 12/1986 | Ausnit | 156/499 |

FOREIGN PATENT DOCUMENTS 0487775 10/1975 U.S.S.R. ............................ 156/497

Primary Examiner—Michael W. Ball
Assistant Examiner—Steven D. Maki
Attorney, Agent, or Firm—Jones, Tullar & Cooper, P.C.

[57] ABSTRACT

Apparatus for manufacturing plastic film stock material including a sealing head utilizing heated air for continuous welding of reclosable plastic closure strips of plastic film. The sealing head is an elongated block having tapered walls which form a narrow bottom edge. The edge is curved longitudinally to match the curvature of a cooperating platen to define a small welding gap through which pass plastic webs to be welded. The sealing head includes a plurality of air distribution manifolds interconnected by passageways to provide a tortuous path for air flowing through the head from an inlet to an elongated, narrow exit slot formed at the bottom edge of the head. Multiple sealing heads are mounted on a carrier frame for positioning adjacent the platen to produce elongated welds to secure two-piece closure strips to a plastic web.

24 Claims, 6 Drawing Sheets

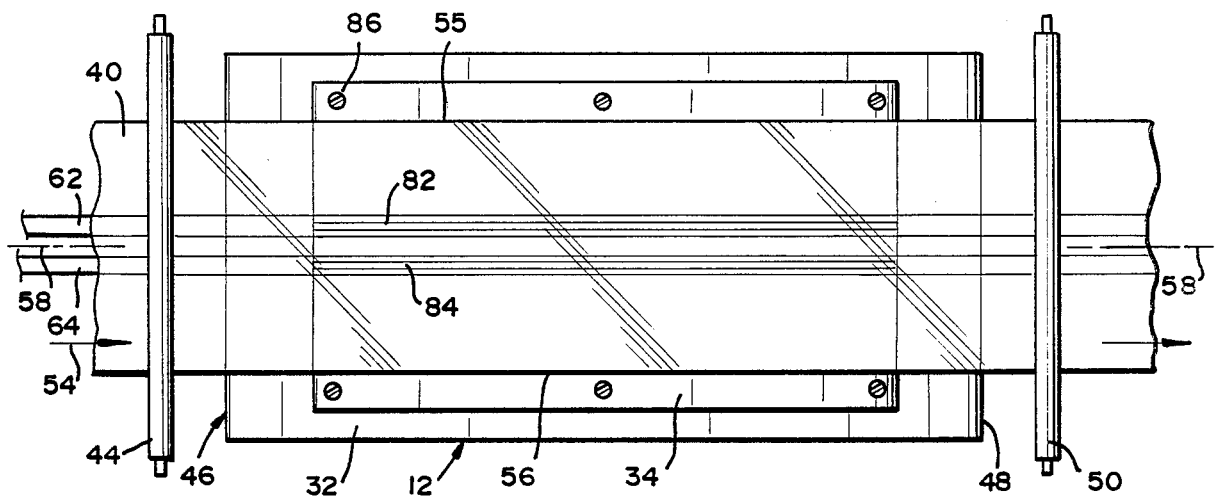
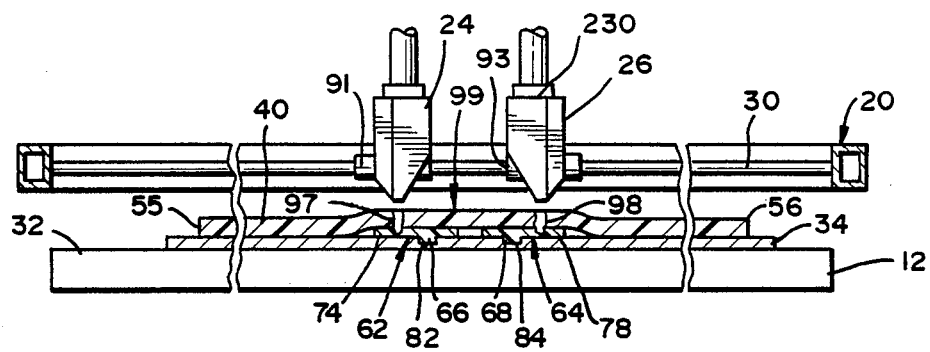
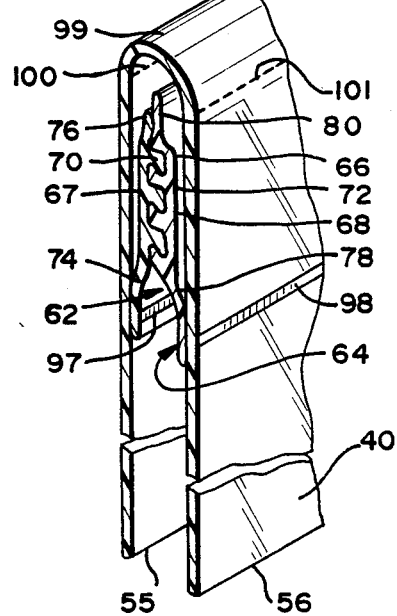
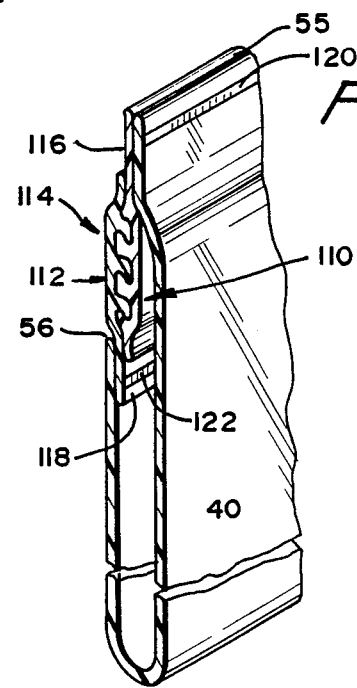

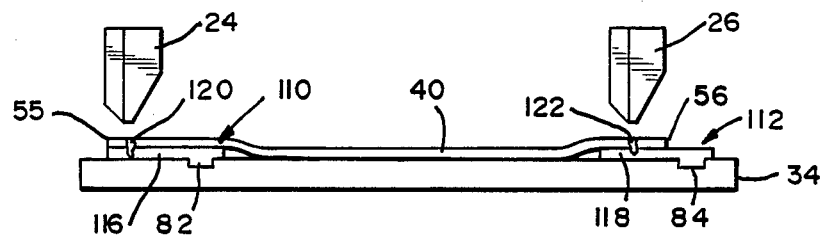
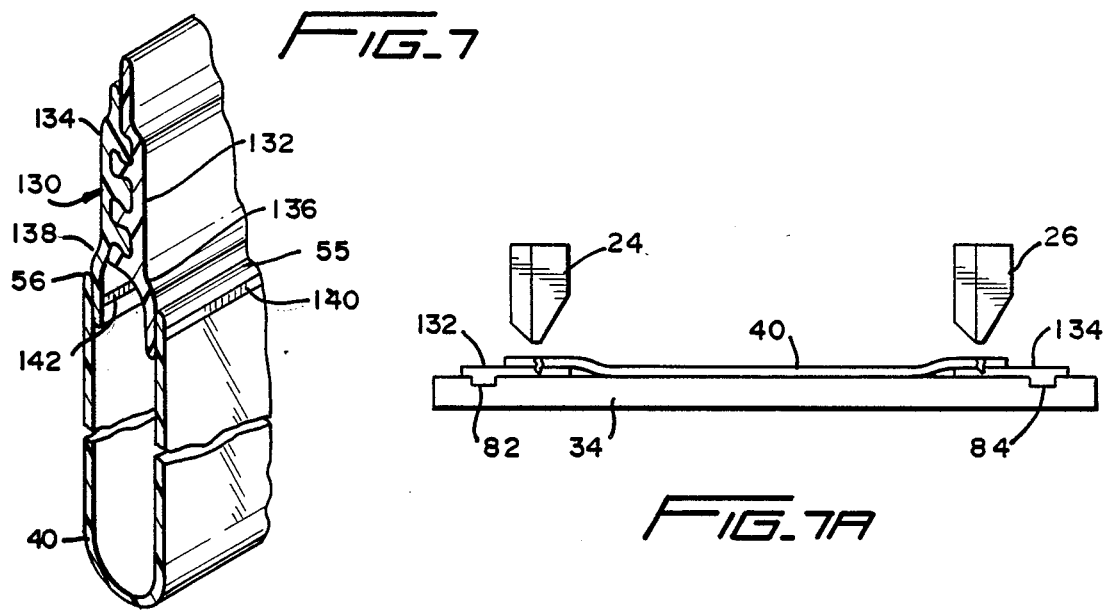
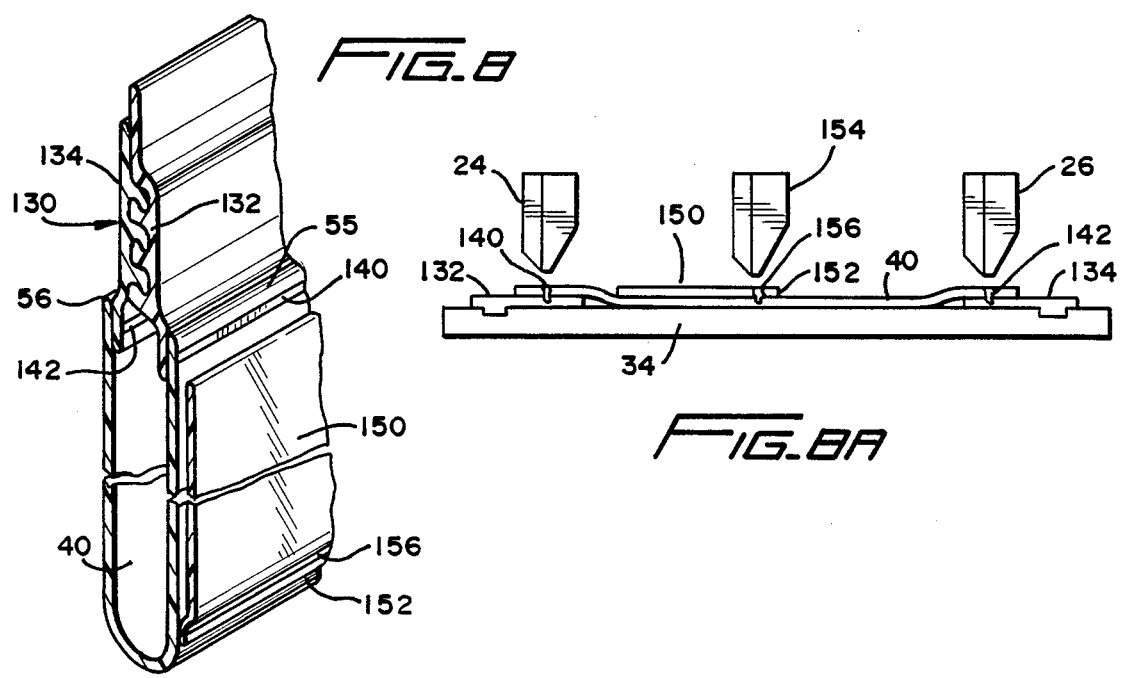

U.S. Patent    Dec. 11, 1990    Sheet 4 of 6    4,976,811
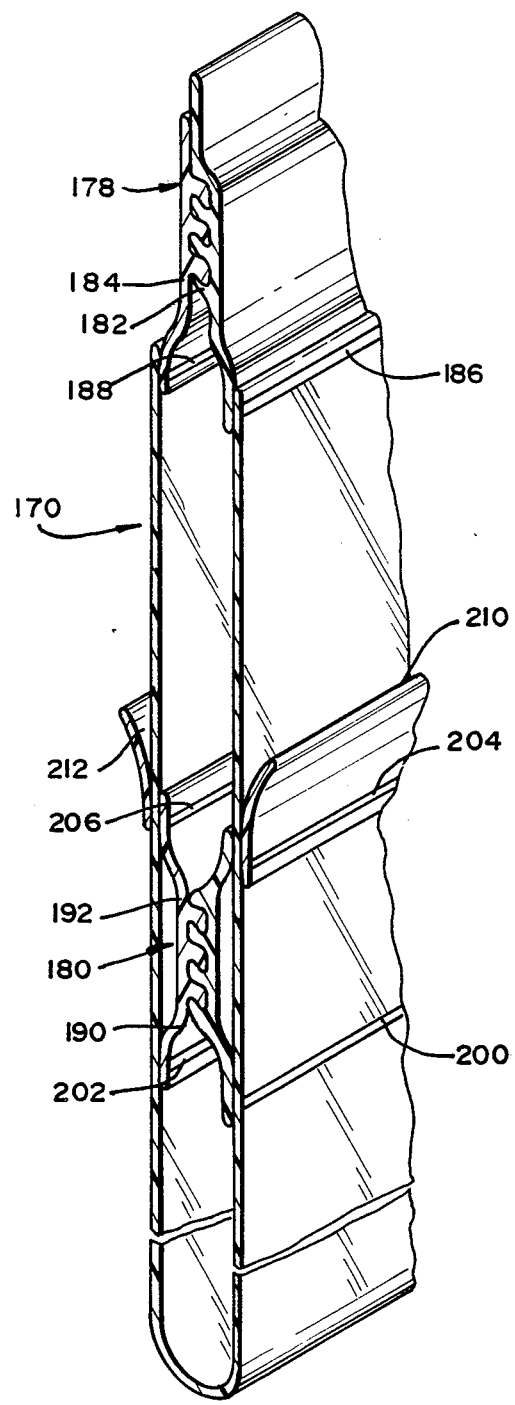
FIG_9
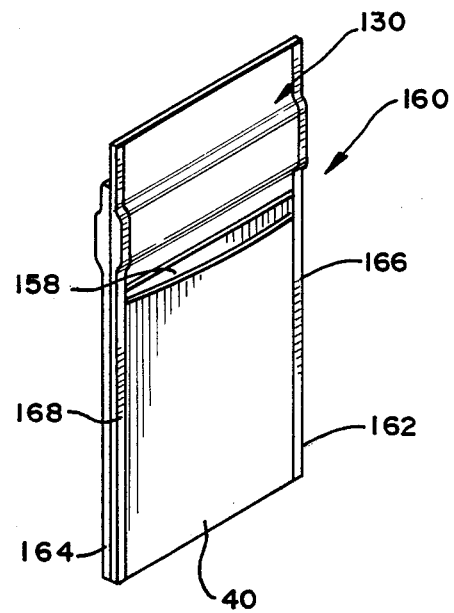
FIG.8B

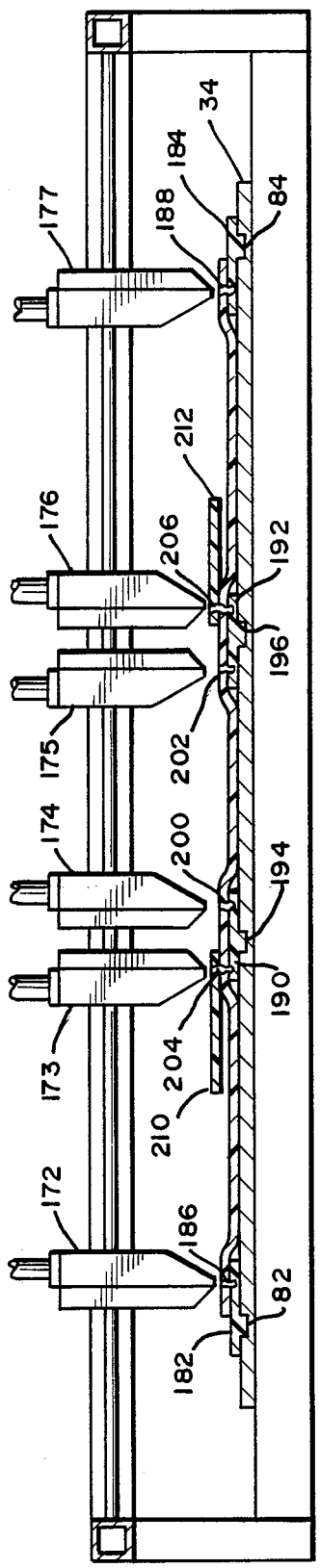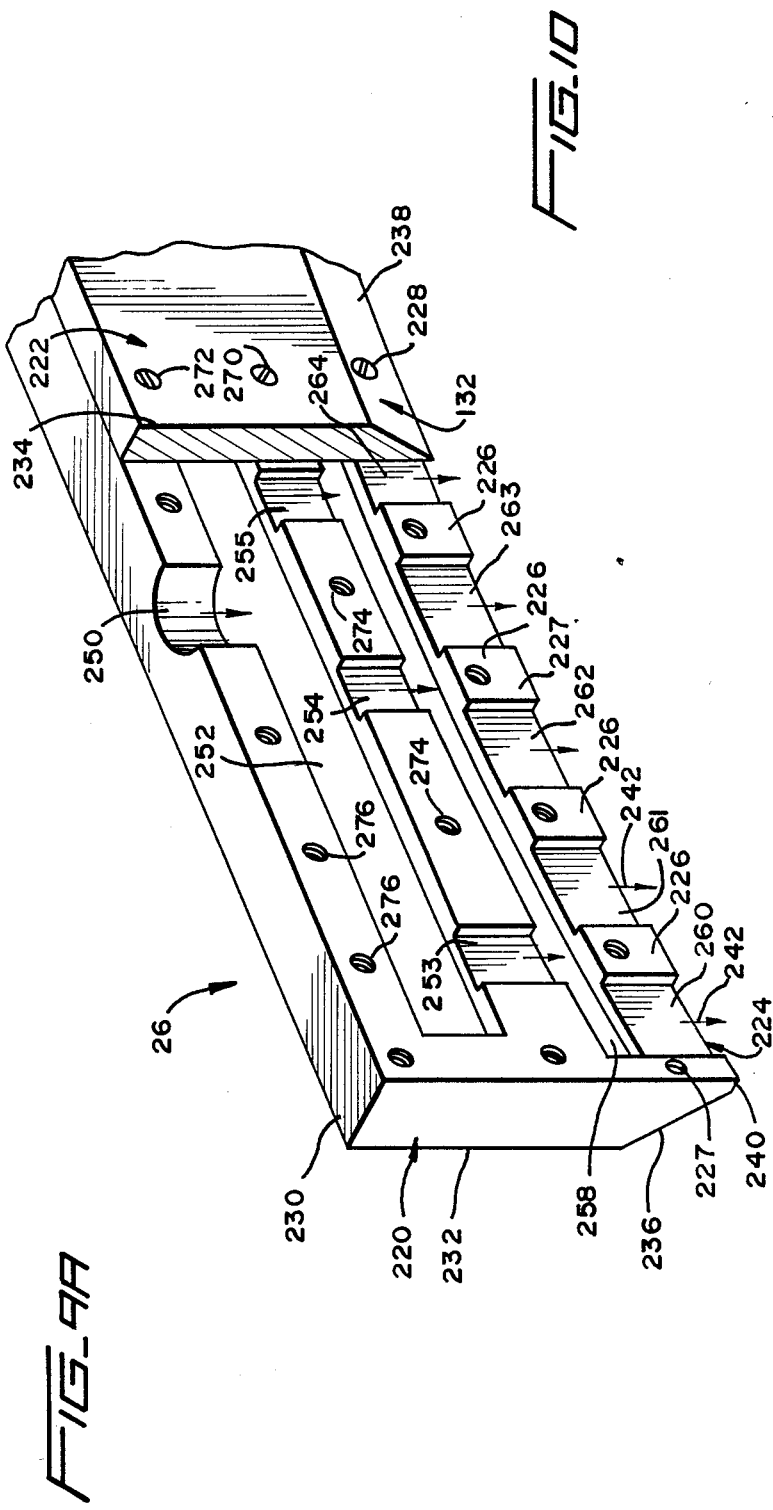

APPARATUS FOR SEALING FILM INCLUDING SEALING HEAD WITH WEDGE-SHAPED LOWER-PORTION

BACKGROUND OF THE INVENTION

The present invention relates, in general, to apparatus for manufacturing stock material from which flexible wall containers are made, and more particularly, to a sealing head utilizing heated air for securing lengths of resealable plastic closure strips to plastic film to produce a stock material.

In U.S. Pat. No. 3,846,209, the applicant herein disclosed a process and apparatus for securing the two halves of a conventional resealable plastic closure strip to corresponding edges of a folded plastic sheet to form a stock material web from which bags and other openable and resealable containers were to be formed. In accordance with that patent, a folded plastic film was fed from a stock roll onto a carrier which supported the film in a horizontal position. Simultaneously, a two-piece closure strip was fed from a second stock roll through a guide block which aligned the strip with a welding station. The upper ply of the folded plastic film was fed into a heat welding apparatus at the welding station where one edge of the film was aligned with one edge of the closure strip and the two edges were then welded together. The lower ply of the film web has initially folded downwardly so that it bypassed the welding station, but after the film closure strip passed out of the welding station, the lower ply was folded upwardly to coincide with the free edge of the closure strip. The film and closure strip were then fed through guide rollers and a second guide block which aligned the free edge of the closure strip with the edge of the lower ply of the film in a second welding station, where these two edges were welded together. Thereafter, the completed stock material was fed to a take-up reel for storage, or was fed to a suitable bag forming machine. In accordance with this patent, the heat-welding apparatus was of the rotary band type, having upper and lower stainless steel bands which engaged the upper and lower surfaces of the film and carried it through the heat welding unit. The actual heat welding was accomplished by a pair of heating bars which engaged the steel bands and which were maintained at the proper temperature to soften the plastic sufficiently to effect a complete weld of the closure strip to the sheet material. The heating bars were held out of contact with the plastic material by the steel bands so that melted plastic would not stick to the bars.

Although the system as described in U.S. Pat. No. 3,846,209 worked well for many years, it has now been found desirable to provide a heating system which will effect a complete welding of the closure strip to the plastic film without physical contact between the heater and the film, for such contact tends to distort or wrinkle the film, and tends to limit the rate of speed at which the film can pass through the heating station. Although steel bands were interposed between the heating bars and the film in the aforesaid patent, nevertheless it was found difficult to obtain a uniform and continuous heating and welding without occasionally overheating and burning the film. Further, it was found that when it was necessary to stop the machine for adjustment, maintenance or repairs, a great deal of waste material resulted, for usually a run of about 50 feet was required after start-up before the machine reached its operating condition and produced satisfactory welding of the fastener strip to the film.

Accordingly, it is desirable to provide apparatus for securing closure strips to a thin, flexible plastic film on a continuous basis without contact between the heating equipment and the material being heated. Although attempts have been made in the past to provide such a system, such attempts have generally been found unsatisfactory.

SUMMARY OF THE INVENTION

It is, therefore, an object of the present invention to provide apparatus for continuously welding one strip of plastic material to another without contact and at a relatively high speed while obtaining a uniform and continuous weld between the parts. More particularly, it is an object of the present invention to provide apparatus for continuously welding a closure strip to a thin, flexible plastic film, particularly for producing stock material from which flexible containers can be formed.

In accordance with the invention, a thin, flexible plastic film, or web, of indeterminate length is supplied from a reel to a welding station where the film is to be joined to a strip of stock material such as a conventional two-part closure strip which is also supplied to the welding station from a reel carrying an indeterminate length of this material. The welding station includes a base which incorporates a base plate, or platen, formed in a continuous, constant-radius curve from the front edge of the base to its back edge, along the path of travel of the film and strip material. Guide and feed rollers are provided to direct the film to the front edge of the base and to keep the film taut as it moves along the length of the base across the top surface of the platen toward the back edge of the base. The platen includes one or more grooves which receive the fastener portion of the closure strip to guide the strip along the path of the web and to align the strip with the film at the location where the weld is to be made. Preferably the platen grooves are laterally adjustable; alternatively, interchangeable platens may be provided, each of which has grooves formed at different locations, as required for different applications of the strip of the film.

The curvature of the platen is sufficient to keep the film taut as it moves through the sealing station so that it will not wrinkle or be otherwise distorted by the welding operation. Welding is carried out by one or more sealing heads which extend longitudinally along the platen, parallel to the path of the film and the fastener strip through the welding station. Each sealing head is identical, and each has its bottom edge curved at the same radius as the base so that when the head is in its operating position, its bottom edge is spaced between 1/16 and ⅛ inch above the surface of the film along substantially the entire length of the sealing head. The head is generally wedge-shaped in cross-section and has an elongated exit slot along the bottom edge, or apex, of the wedge. This exit slot directs heated air toward the film in a concentrated, elongated path so that as the film passes along the length of the sealing head, the film is heated to a welding temperature, causing the material of the film and the material of the closure strip to melt enough to permanently join the strip of the film.

The sealing head air exit slot is narrow so that the air is directed onto a very narrow portion of the film, thereby forming a weld which extends along the length of the film, but which is very narrow. The wedge shape of the head enables the heated air which is directed toward the film surface to be reflected from that surface and to travel upwardly and outwardly away from the area of impact so that the heating effect is restricted to a very narrow path. This concentration of the air flow allows more rapid heating of the material, causes the heated air to be directed to a more restricted area so that adjacent areas are not affected, and thereby permits more accurate control of the temperature of the plastic material so that the weld can be controlled accurately and reliably.

The sealing head is connected to a source of air under relatively high pressure, for example 30 to 45 psi, through a tubular air supply channel which contains an electrical heating element. The heating element is thermostatically controlled to maintain the air temperature at the desired level, in conventional manner. The air flows from the heating chamber into a first distribution manifold formed within the sealing head and extending substantially the entire length thereof. This first manifold distributes the heated air along the length of the sealing head to cause the body of the sealing head to become uniformly heated to the desired temperature. The air then flows from the first manifold downwardly through a plurality of distribution passages to a second distribution manifold formed within the sealing head, extending substantially its entire length, and spaced below the first manifold but above the bottom edge of the sealing head. Air from the second distribution manifold then flows downwardly through the elongated exit slot and out of the sealing head, as previously described.

Preferably, the sealing head is a two-piece assembly formed from a metal block and a cover, with the manifolds and air passages being formed in one surface of the block, and covered by the cover piece to form the completed unit. Preferably, both the block and the cover are formed of a material such as stainless steel.

The air flow through the sealing head is typically 15 to 30 cubic feet per minute, depending on the thickness of the film, the type of plastic being used, and the rate at which the film travels through the sealing station. Normally, the film will move at about 65 to 70 feet per minute, although speeds up to about 100 feet per minute may be used, if desired. For a conventional 4 mil plastic film the sealing head would be heated to a uniform temperature of 600° to 800°, and the air flowing out of the bottom exit slot would have the same temperature. This would produce a weld between 1/32nd and 1/16th inch wide and about 2.4 mils deep in the film and closure strip.

After the film and the attached strip move away from the sealing head, and the weld line cools, the film may be directed to a storage roll for subsequently process, which may include forming the film into separate containers.

BRIEF DESCRIPTION OF THE DRAWINGS

The foregoing, and additional objects, features, and advantages of the present invention will become apparent to those of skill in the art from the following detailed description of a preferred embodiment thereof, taken in conjunction with the accompanying drawings, in which:

FIG. 3 is a top plan view of the apparatus of FIG. 1 with the sealing head carrier frame structure removed;

FIG. 4 is a cross sectional view of the apparatus of FIGS. 1 and 2, taken along line 4—4 of FIG. 2;

FIG. 5 is a partial sectional view of the stock material produced by the apparatus of FIGS. 1-4;

FIG. 6 is a partial sectional view of a second embodiment of the stock material from which a flexible wall container may be formed;

FIG. 6A is a diagrammatic illustration of the arrangement of two sealing heads to produce the stock material of FIG. 6;

FIG. 7 is a partial sectional view of a third embodiment of the stock material produced by the apparatus of the invention from which a flexible wall container can be formed;

FIG. 7A is a diagrammatic illustration of the arrangement of two sealing heads to produce the stock material of FIG. 7;

FIG. 8 is a partial sectional view of a fourth embodiment of a stock material for containers;

FIG. 8A is a diagrammatic illustration of the arrangement of three sealing heads to produce the stock material of FIG. 8;

FIG. 8B is a diagrammatic illustration of a container formed from the stock material of FIG. 8;

FIG. 9 is a partial sectional view of a fifth embodiment of a stock material for containers;

FIG. 9A is a diagrammatic illustration of the arrangement of six sealing heads to produce the stock material of FIG. 9.

FIG. 10 is a partial perspective view of a sealing head constructed in accordance with the present invention;

DETAILED DESCRIPTION OF THE PREFERRED EMBODIMENTS OF THE INVENTION

Figure 1:
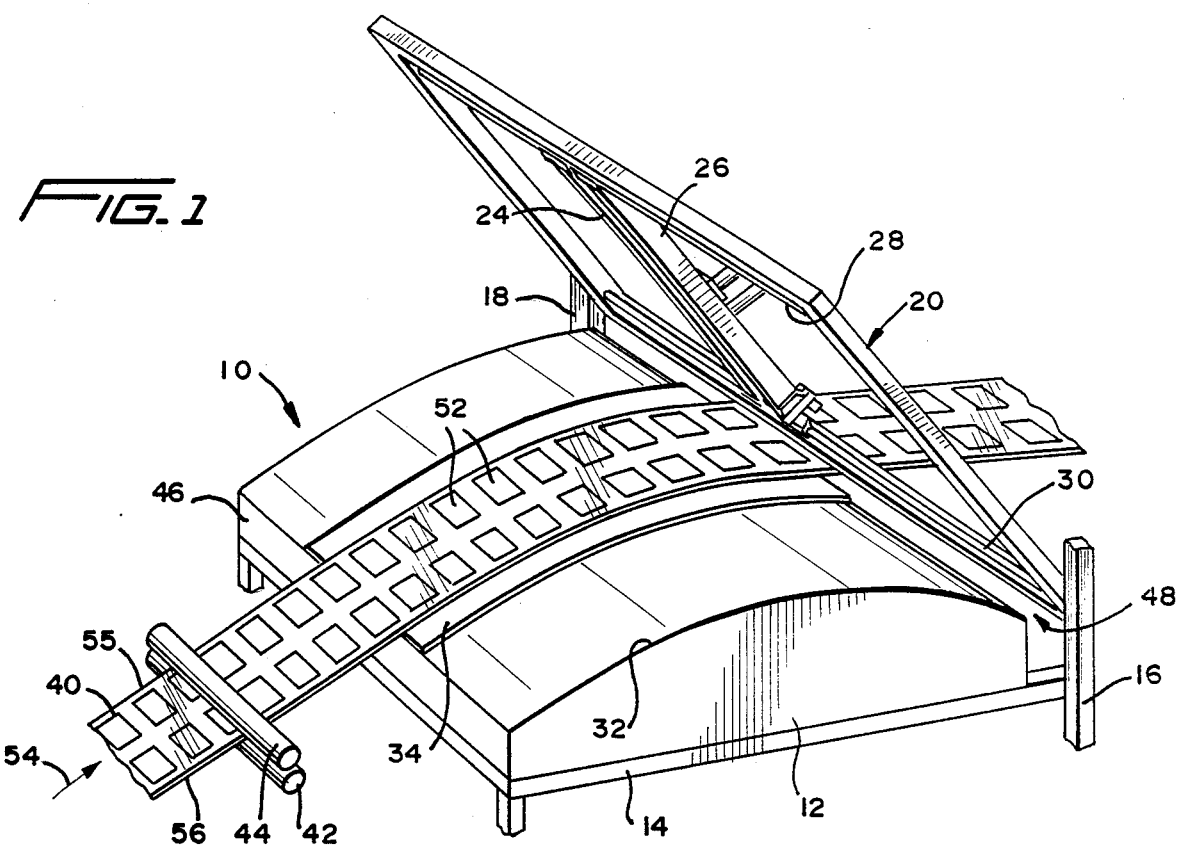
FIG. 1 is a perspective view of welding apparatus for applying closure strips to plastic film and utilizing sealing heads constructed in accordance with the present invention, showing the sealing heads in a nonsealing, or open position.
Figure 2:
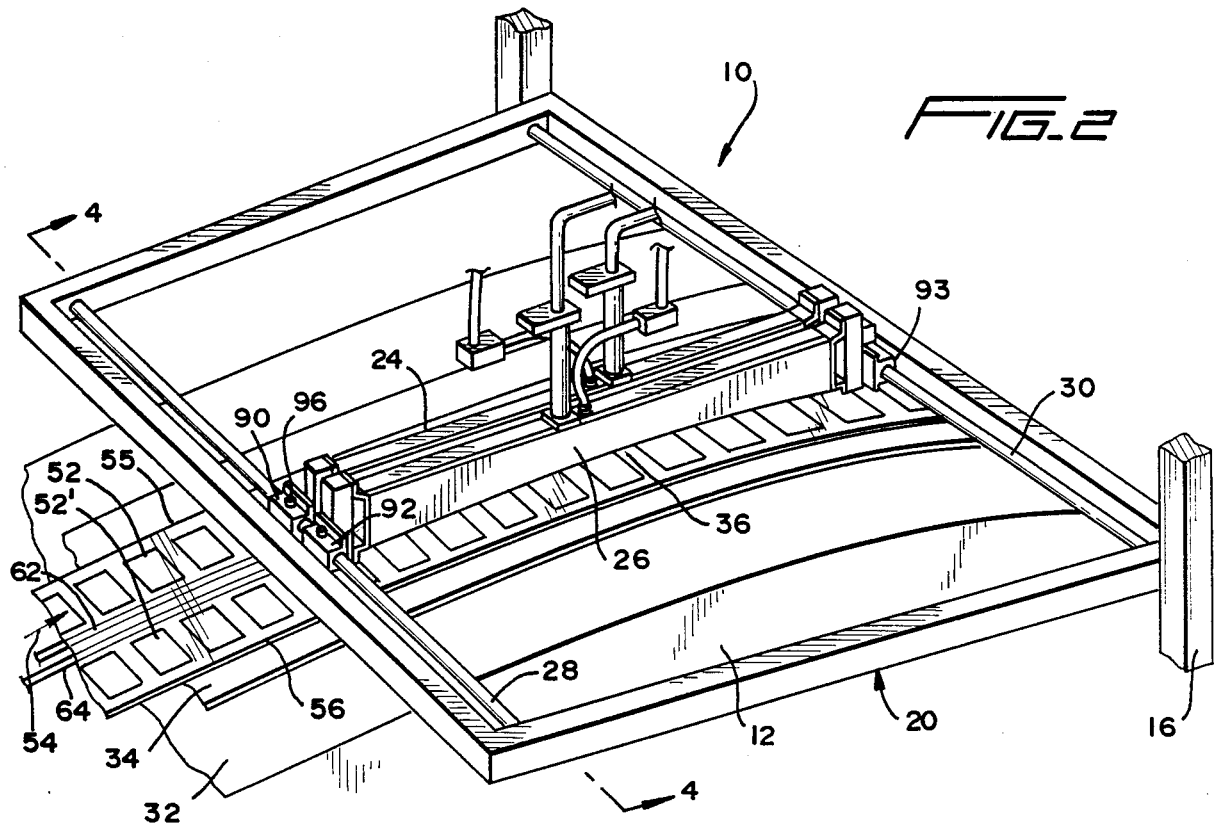
FIG. 2 is a perspective view of the apparatus of FIG. 1 with the sealing heads in their operational, or closed position.

FIGS. 1 and 2 are diagrammatic illustrations of a welding apparatus 10 for attaching closure strips to plastic film. The welding apparatus includes a base, or bed, 12 mounted on a suitable support frame 14 having a pair of uprights 16 and 18 to which a movable sealing head carrier frame 20 is pivotally mounted. The carrier frame carries as many as three pairs of sealing heads with two heads 24 and 26 being illustrated, the heads being slidably mounted on laterally extending bars 28 and 30 for lateral adjustment, as will be described below.

The bed 12 has a curved upper surface 32 which supports a curved platen, or base plate 34. The base plate extends longitudinally along the top surface 32, with the sealing heads 24 and 26 forming a welding station 36 for heating and joining together plastic materials, and more particularly, for welding long plastic closure strips to a plastic web continuously and at a relatively high rate of speed as the film and closure strips pass through the welding station.

The film to be welded is a conventional plastic film or web such as polyethylene, light gauge vinyl, polyvinylchoride or and the like. Such films are conventionally used to form flexible containers, and are widely available commercially. A web or film 40 is illustrated in FIG. 1 and may be supplied from a reel (not shown) and fed through suitable guide, nip, and idler rollers such as the rollers 42 and 44 which direct the film to the upper surface of platen 34 of the welding apparatus 10. The film travels longitudinally through the welding apparatus, along the top surface of the platen, entering the apparatus 10 at a first or front end 46 and leaving the apparatus at a second or back end generally indicated at 48. The web is drawn continuously through the welding station 36 by suitable drive rollers such as the roller 50 shown in FIg. 3, in conventional manner, and may then be fed through a conventional folder to a storage reel (not shown), for example. The film may be approximately 4 mils thick and may be clear, or may be preprinted with labels, printed matter, identifying logos, or the like. In FIGS. 1 and 2, the film is shown as having a series of labels 52 and 52' preprinted on one surface thereof. Usually, these labels will constitute the front and back panels of finished containers, after the web is folded and is fed through a cutting and sealing machine which cuts apart adjacent containers and seals their edges.

As illustrated, the platen 34 is curved, or bowed, along the direction of travel of the film, indicated by arrow 54, with the axis of curvature being below the surface of the platen and perpendicular to the direction of motion of the film. A large radius of curvature is provided so the film path is slightly curved through the weld station 36. The rollers at the opposite ends of the weld station hold the film taut against the surface of the platen, and the rollers are carefully aligned so that the film travels in a straight path through the weld station 36 without stretching, or with a slight amount of stretch but with equal amounts on each of the side edges 55 and 56 of the film. This prevents skewing and warping or wrinkling of the film as it passes through the weld station. The platen 34 preferably is removably secured to the top surface of base 32 so that it may be easily positioned at various locations on the bed or may be replaced.

In FIG. 3, the web 40 is shown as being clear, without the labels 52 or other printed material, and is illustrated as passing longitudinally along the platen 34, parallel to the longitudinal axis 58 of the welding machine 10, with the drive roller 50 at the outlet end 48 of the welding station 36 being included for purposes of illustration. It will be understood that the rollers 42, 44 and 50 are illustrative only, and may take a wide variety of forms to provide a smooth, continuous, rapid motion of the web 40 along the longitudinal axis.

A pair of closure strips 62 and 64 are shown as being supplied to the welding station for attachment to the undersurface of web 40. The strips 62 and 64 are the two halves of a conventional two-part pressure closure, for example, of the type illustrated in cross section in FIG. 5 at 66. Such closure strips conventionally each include an enlarged fastener portion generally indicated at 67 and 68 which have interlocking fingers 70 and 72. The enlarged fastener portions are formed with laterally extending web portions by which the closure strips are secured to the film web 40. The strip 62 includes a lower web portion 74 which is to be secured to the film, and an upper web portion 76 which is not secured, and which is used to open the fastener. In similar manner, the strip 64 includes a lower web portion 78 which is to be secured to the film and an upper web portion 80 which is not secured, and is also provided for use in opening the closure 66.

The closure strips 62 and 64 are supplied to the welding station 36 through suitable guide rollers (not shown), from supply reels (not shown), and are fed onto the surface of platen 34 as illustrated in FIG. 3. The two closure strips 62 and 64 are supplied separately and side by side in alignment with the film web 40 so that the laterally extending web portions will be adjacent the locations on the web to which they are to be welded. The closure strip portions are drawn through the welding station at the same rate of speed as the film 40, and pass beneath the sealing heads 24 and 26 in the welding station, where heat is applied and the closure strips are secured to the film.

The two closure strips 62 and 64 are held in alignment with the film web 40, as they pass through the welding station, by means of grooves 82 and 84 (FIGS. 3 and 4) which are formed in the top surface of the platen. These grooves receive the enlarged fastener portions 66 and 68, respectively, of the closure strips and serve to guide the strips two as they travel along the length of the platen. These strips follow the grooves, which are positioned exactly with respect to the film web 40 so as to locate the lateral web portions 74 and 78 of the closure halves at the desired positions with respect to the film web 40, as best illustrated in FIG. 4.

The platen 34 is shown as a single piece in the embodiment of FIGS. 3 and 4, with the grooves 82 and 84 formed in the top surface thereof. If a different location is required for the strips, or if more than two strips are to be secured to web 40, the platen can be replaced with one having different groove locations, and for this purpose the platen is preferably secured for easy removal by means of screws or similar fasteners generally indicated at 86 in FIG. 3. Alternatively, the platen can be formed in multiple parts, with the grooves being formed in corresponding narrow platen segments which can be positioned on the base in any alignment with the web 40, and with suitable spacers being provided between the grooved segments to provide a smooth surface for the web as it moves through the welding station.

The sealing heads 24 and 26 are shown in FIG. 2 as being slidably mounted on transverse guide bars 28 and 30 for easy lateral adjustment with respect to the grooves 82 and 84, so that the sealing heads can be positioned immediately above the later web portions 74 and 78 of the closure strips 62 and 64 as illustrated in FIG. 4. Bearing sleeves 90 and 91 support opposite ends of the sealing head 24 and bearing sleeves 92 and 93 support opposite ends of sealing head 26 on the bars 28 and 30. A set screw 96 may be provided on each of the bearing sleeves to secure the sealing heads in place, once they are properly positioned. The frame 20 may be shifted between its open position, shown in FIG. 1, and its closed position, shown in FIG. 2, by means of suitable hydraulic or pneumatic cylinders (not shown).

As the film web 40 and the strips 62 and 64 move together longitudinally through the welding station 36, the sealing heads 24 and 26 apply heat to the upper surface of the film web 40, at sealing regions 97 and 98 (FIG. 4) at a sufficiently high temperature to slightly melt the film and to heat the underlying lateral web portions 74 and 78, respectively. As the film web 40 and the strips 62 and 64 travel the length of the sealing heads, the materials are heated sufficiently that the lateral web portions 74 and 78 are welded to the undersurface of the film web 40 at sealing regions 97 and 98 (see FIG. 5) so that when the web 40 leaves the exit end 48 of the welding station, the web and the fastener strips are secured together by a continuous weld, providing a stock material from which bags or similar containers can be formed.

For example, in the embodiment illustrated in FIGS. 1-4, it is anticipated that the stock material shown in cross-section in FIG. 4 will, upon leaving the end 48 of the welding station, be folded in half, in the manner illustrated in FIG. 5, with the lateral edges 54 and 55 of film 40 being brought together so that the two closure strips 62 and 64 are also brought together, with the central portion 99 of the web 40 covering the closure 66. In the preferred form of the invention, the folded stock material is pressed together by means of a pair of nip rollers to connect the closure halves, as shown in FIG. 5. The stock material can then be fed to a storage reel, and later may be formed into containers by cutting the stock material transversely and sealing the edges formed by such cuts to thereby produce containers having open bottoms which can then be filled and the bottoms sealed. This produces a tamper evident container, since the central portion 99 of the web 40, which is between the fastener strips 62 and 64 when web 40 is flat, folds over the fastener 66 to prevent access to it. The central portion 99 thus must be cut away before the container can be opened by separation of the fastener sections 67 and 68. In a preferred form of the invention, the tamper evident portion 99 is serrated, as at lines 100 and 101, so that the central portion 99 can be torn away to provide access to the closure. The cutting and edge sealing of such stock material to form individual bags or flexible containers is described in U.S. Pat. No. 3,986,914 issued to the applicant herein.

The advantages of the adjustability of the sealing heads is illustrated in FIGS. 6 and 6A, in a second embodiment of the invention, wherein closure strips 110 and 112 of a closure 114 are placed near the outer edges 55 and 56 of the film web 40 so that the strip lateral web portions 116 and 118, respectively, are aligned with the edges of the film. This necessitates relocation of the grooves 82 and 84 in platen 34 and repositioning of the sealing heads 24 and 26 along mounting bars 28 and 30 as shown in FIG. 6A, and produces a stock material which, after folding and pressing the closure halves together, has the shape illustrated in FIG. 6. The heads 24 and 26 produce continuous welds 120 and 122 to seal the web 40 to the closure 114. The stock material is then formed into flexible wall containers, as previously described.

Another arrangement of the sealing heads to produce a third style of stock material is illustrated in FIGS. 7 and 7A in this embodiment, closure 130 includes closure strips 132 and 134 which have their respective lateral webs 136 and 138 overlapping the side edges 55 and 56 of web 40. The sealing heads 24 and 26 are adjusted to be aligned with the overlapping region (see FIG. 7A), so that welds 140 and 142 are formed along the length of the web 40 as the web and the connector strips move through the welding station. Folding of web 40 results in the stock material illustrated in FIG. 7.

An arrangement which requires three sealing heads mounted on the assembly 20 is illustrated in FIGS. 8 and 8A. In this case the stock material includes the web 40 and a closure 130, secured in the manner described with respect to FIGS. 7 and 7A, and accordingly common elements carry common reference numerals. However, the stock material of FIG. 8 is formed with an additional layer 150 which is welded near its bottom edge 152 to the web 40. For this purpose, a third sealing head 154 is mounted in frame 20, and is aligned over the layer 150, as illustrated in FIG. 8A, to produce a continuous weld region 156 along the web 40. The layer 150 provides an exterior pocket 158 on the containers formed form the stock material of FIG. 8, as illustrated diagrammatically by the container 160 in FIG. 8B. This container is formed by cutting the stock material of FIG. 8 by means of a heated cutter bar, for example, which provide a pair of cut container edges 162 and 164 and which at the same time produces heat-sealed welds 166 and 168 which seal the edges of the container. Access to the interior of the container 160 is obtained by pulling apart the two closure strips 132 and 134. Pressing the strips together reseals the container.

FIGS. 9 and 9A illustrate a stock material 170 which is produced through the use of six sealing heads 172-177 in the welding apparatus 10 of the present invention. The stock material includes the web 40 to which are attached first and second closures 178 and 180. The first closure includes closure strips 182 and 184 which are connected at opposite edges of web 40, in the manner of closure 130 in the embodiment of FIG. 8. Two weld regions 186 and 188 are formed by sealing heads 172 and 177, respectively to provide the connections for closure 178.

The second closure 180 for stock material 170 is formed by closure strips 190 and 192 which are guided by two additional longitudinal grooves 194 and 196 formed in platen 34. This closure is secured to the web 40 on both sides of the fastener portions of the closure strips, so that the closure can be opened by grasping the side walls of the container formed from the stock material 170. Thus, four additional sealing heads are required to secure closure 180 to web 40, as illustrated in FIG. 9A, with sealing heads 174 and 175 producing welds at regions 200 and 202, and sealing heads 173 and 176 producing welds at regions 204 and 206.

To facilitate separation of the closure strips 190 and 192 to open the closure 180, a pair of opening tabs 210 and 212 are secured to the outside surface of the web 40. Preferably, these tabs are formed from elongated strips of material, preferably of the same material as web 40, which are positioned on the top surface of web 40 as it is fed through the welding station. The strips 210 and 212 are aligned with, and overlap, the lateral webs of closure strips 190 and 192 so that the welds produced by sealing heads 173 and 176 secure the tabs in place at the same time as the closure strips are welded to web 40.

Numerous additional variations in the stock material can be produced by the apparatus 10, by repositioning or using different numbers of sealing heads, as required.

Figure 11:
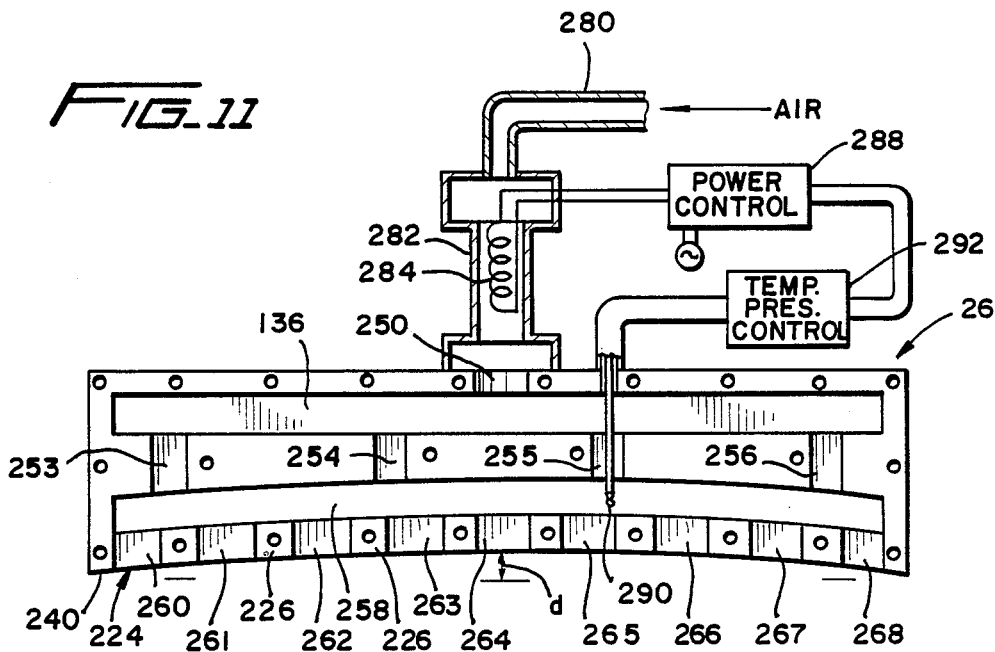
FIG. 11 is a side elevation of the sealing head of FIG. 10 with the cover removed and showing the air supply.

One of the sealing heads shown in FIGS. 1 and 2 and illustrated in end view in FIGS. 4, 6A, 7A, 8A and 9A is illustrated in greater detail in FIGS. 10 and 11, to which reference is now made. The sealing head 26 is here illustrated but it will be understood that all of the sealing heads are substantially the same. Each sealing head is constructed to provide a continuous, linear, converging flow of heated air which impinges on the top surface of film 40 in the region to be welded to provide a localized, controlled source of heat without physical contact between the head and the film. The sealing head is elongated, generally wedge-shaped in cross-section, and preferably is formed in two parts: a main body portion 220, and a cover 222, both formed from a material such as stainless steel. The body portion incorporates a plurality of air passageways and air manifolds to regulate the air flow, by causing the air to pass along a tortuous path so as to heat the block uniformly, and to flow out of the head through an elongated, narrow outlet slot 224 formed at the bottom edge of the head.

The outlet slot 224 preferably is continuous along the length of the sealing head, but may be segmented by a plurality of spaced, raised bosses 226 which are relatively narrow so as not to interfere significantly with the flow of air from slot 224 but which provide solid bases for threaded apertures 227 which receive threaded fasteners such as screws 228 to secure cover 222 on the sealing head. The thin slot 224 provides a concentrated flow of air from the sealing head 26 at a relatively high flow rate in order to produce a thin welding region such as regions 97 and 98 in FIG. 5, on the film 40. The tortuous path followed by the air through the sealing head produces a uniform heating of the entire body portion 220, to ensure a uniform air temperature when it exits from the slot 224.

Figure 12:
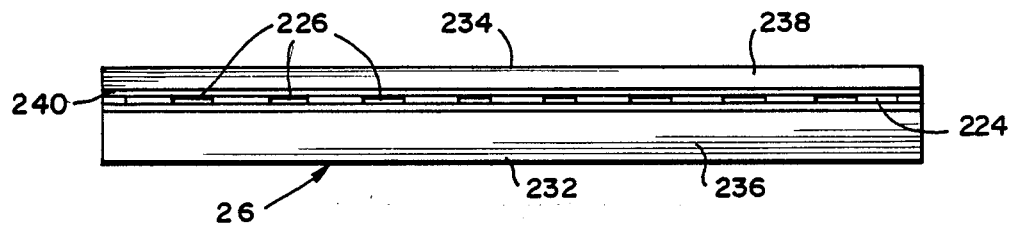
FIG. 12 is a bottom view of the sealing head of the present invention.
Figure 13:
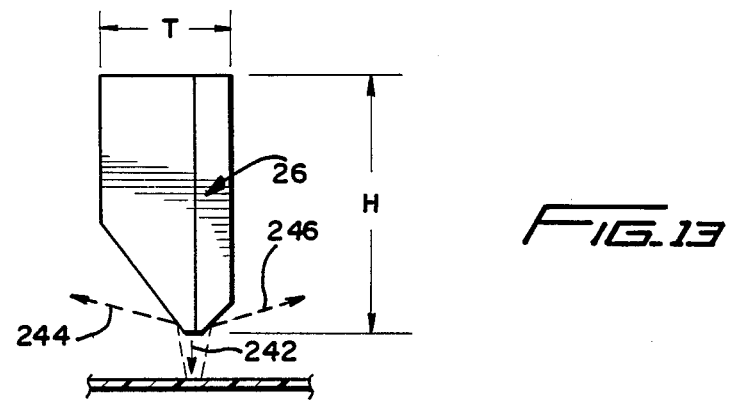
FIG. 13 is an end view of a sealing head, showing its air flow pattern.

As illustrated in FIG. 4, the sealing head 26 is generally wedge-shaped in cross-section, having a relatively wide top surface 230, vertical side walls 232 and 234, and at the lower part of the head, downwardly and inwardly tapering wall portions 236 and 238 terminating at a bottom edge 240 in which is formed the slot 224 (See FIG. 12). The wedge shape at the base of the sealing head allows air which is directed downwardly from the slot 224, in the direction of arrows 242, to flow downwardly and strike the surface of film 40 essentially vertically. This heated air is reflected generally upwardly by film 40 and strikes the tapered surfaces 236 and 238, which deflect the air generally outwardly, away from the sealing head, as indicated by the dotted lines 244 and 246 in FIG. 13. This pattern of air flow allows heated air to strike the surface of the film in a longitudinal line that is quite narrow, and avoids heating the film adjacent the region where the weld is to take place. This prevents the adjacent areas of the film from wrinkling and burning, particularly in areas not backed up by a fastener strip.

As best illustrated in FIG. 11, the bottom edge 240 of the sealing head is curved continuously and uniformly along its length. This curvature preferably has the same radius as the curvature of the platen 34, with the sealing head having its axis of curvature beneath the bottom edge 240 and perpendicular to the length of the sealing head.

The body portion 220 of the sealing head preferably contains the air passageways. These may be formed on one surface thereof as by milling, in the manner shown in FIGS. 10 and 11, and closed by the cover portion 222 which is tightly secured to the block portion by means of fasteners 228. If desired, a gasket material may be placed between the cover and the main body portion to prevent leakage of the pressurized hot air in the head. Alternatively, the passageways may be formed by casting them in a unitary block when it is formed, as by using the "lost wax" method, so that a separate cover is not required.

In the preferred form, the air passageways formed in main body portion 230 include an inlet 250 leading from the upper surface 230 into an elongated distribution manifold 252. This distribution manifold extends substantially the entire length of the sealing head 26 and is near the upper surface 230. This distribution manifold allows air to flow from the inlet 250 along the entire length of the sealing head to heat the head uniformly and to supply air under pressure to a plurality of distribution passageways such as those illustrated at 253-256. These passageways are spaced along the length of the distribution manifold 252 and supply air to a second, lower distribution manifold 258 which also extends substantially the full length of the sealing head 26. Distribution manifold 258 preferably is curved so as to be parallel with the bottom edges 240 of the sealing head, and the bottom of this manifold opens into a plurality of exit passageways 260-268, which terminate in the outlet slot 224. Between these passageways are the bosses 226 previously described. Preferably, the passageways 253-256 are offset from the passageways 260-268.

The inner surface of the cover 222 preferably is flat, and contacts the surfaces of the bosses 226, as well as the portions of the main body 220 surrounding the manifolds 252 and 258 and the passageways 253-256 so as to provide an airtight connection and to restrict the air flow to the passageways. Additional features such as screws 270 and 272 engage corresponding threaded apertures 274 and 276 to secure the cover.

As illustrated in FIG. 11, air is supplied to the sealing head 26 by way of an air supply hose 280 which leads to an inlet heating tube 282. This heating tube contains electrical heating coils 284 connected to a source of power 286 through a suitable control circuit 288. Circuit 288 regulates the electrical current flow to coils 284 to heat the air flowing through the tube 282 for a preselected temperature. This air is is supplied through inlet 250 to the air distribution manifold 252, through passageways 253-256 and into distribution manifold 258, which t flows through the outlet passageways 260-268 and slot 224. In a preferred form of the invention, a suitable temperature sensor 290 placed in the air manifold 258 or, is embedded in the metal block forming the main body portion 220 of the sealing head 26. The temperature of the air or of the body is then detected by sensor circuit 292 and a suitable control signal provided to the power control circuit 288 to regulate the temperature of coil 284 and thereby to regulate the temperature of the air flowing out of the exit slot 224.

In a preferred form of the invention, the sealing head is approximately 24 inches long, has a thickness T of one inch (FIG. 13), and has a height H of two inches. When the heat sealing assembly 10 is in the closed position of FIG. 2, the bottom edge 240 of the sealing head 26 is spaced between about 1/16th and ⅛ inch from the top surface of the film 40 to define a narrow welding gap. Air is supplied to the heating tube 282 at a pressure of between 30 and 40 psi, with an air flow of between 15 and 27 cubic feet per minute, the exact pressure and air flow depending on the type and the thickness of the film being welded, and on the speed of the film as it passes through the welding station 36. It is anticipated that the film will pass through at a speed of approximately 65 to 70 feet per minute, although speeds of up to 100 feet per minute can be used. The stainless steel sealing head is heated to a temperature of 600° to 800°, in the preferred embodiment. To provide the desired smoothness of motion of the film through the welding station, it is preferred that the radius of curvature of the sealing head be such that the center of the bottom edge of the head be raised a distance d (see FIG. 11) above the ends of the bottom edge which is between one and two inches.

To obtain the desired air distribution and flow rates, the air manifold 252 preferably is about ½ inch deep, and ½ inch high, while the passageways 253-156 are each 0.012 inch deep and approximately 0.5 inch wide. The distribution manifold 258 is approximately 0.25 inch deep and ½ inch high, and the outlet passageways 260-268 are approximately 0.002 inch deep, with ½ inch wide bosses 226. The air flow provided by this sealing head at the indicated temperature produces in a 4 mil thick film a weld that is approximately 1/32nd to 1/16th inch wide and which extends through the film layer 40 and into the underlying connector strip by a distance of about 2.7 mils.

Although the present invention has been described in terms in a preferred embodiment, it will be apparent that numerous variations and modifications may be made without departing from the true spirit and scope thereof, as set forth in the following claims.

What is claimed is:

1. Apparatus for securing a first web of plastic material to a second web, comprising:
    platen means having a curved upper surface with a selected radius of curvature;
    at least one elongated sealing head positionable above said platen means to define a welding station, said sealing head having opposed exterior side walls extending the length of said head, said side walls including lower wall portions having elongated bottom edges, the lower wall portions tapering downwardly and inwardly to define an elongated, curved lower edge and to form an elongated lower sealing head portion which is generally wedge-shaped in cross-section;
    means for moving said sealing head into a position wherein said curved lower edge is closely spaced from said platen curved upper surface to provide an elongated welding gap therebetween;
    means drawing first and second webs longitudinally along said platen curved upper surface through said elongated welding gap, said webs being aligned with and extending the length of said welding gap;
    means supplying hot air under pressure and at a preselected, controllable temperature to said sealing head;
    passage means within said sealing head for guiding said air in a tortuous path through said sealing head to maintain said sealing head at a preselected temperature and including narrow, elongated exit slot means formed in and extending along substantially the entire length of said elongated lower edge of said sealing head, said exit slot being located to direct hot air under pressure from said sealing head toward the surface of said first and second webs along the entire longitudinal length of said sealing head to press said webs together, said hot air being reflected from the surface of said webs back toward and against the outer surface of said tapered lower portion of said head to deflect said air outwardly away from said webs and said head, whereby only narrow portions of said webs within said gap are heated to continuously weld said webs together along a narrow weld line as said webs pass through said welding gap.

2. The apparatus of claim 1, wherein said means supplying air under pressure and said exit slot means cooperate to direct air under pressure downwardly into said welding gap at a high flow rate to restrict the heating of said webs to a thin welding region extending along said gap.

3. The apparatus of claim 1 wherein said passage means includes first and second air distribution manifolds each extending substantially the entire length of said sealing head to provide said tortuous path to heat said head uniformly.

4. The apparatus of claim 1, wherein said exit slot means is formed by a gap about 0.002 inch in depth, and wherein said hot air is supplied at a pressure sufficient to provide an air flow of between about 15 and 30 CFM.

5. Apparatus for securing a first plastic web of indeterminate length to a second web of indeterminate length, comprising:
    platen means having a curved upper surface within a selected radius of curvature;
    at least one elongated sealing head positionable above said platen means to define a welding station, said sealing head being elongated and having opposed exterior side walls extending the length of said elongated head, said side walls including lower wall portions having elongated bottom edges, the lower wall portions tapering downwardly and inwardly to define a curved lower edge of said sealing head and to form an elongated lower sealing head portion which is generally wedge-shaped in cross-section;
    elongated exit slot means formed in and extending along said curved lower edge of said sealing head;
    means for moving said sealing head into a position wherein said curved lower edge is closely spaced from said platen curved upper surface to provide an elongated welding gap therebetween;
    means drawing said first and second webs longitudinally along said platen curved upper surface through said elongated welding gap, said webs being aligned with and extending the length of said welding gap;
    means supplying hot air under pressure and at a preselected, controllable temperature to said sealing head;
    passage means within said sealing head for guiding said air in a tortuous path through said sealing head to said elongated exit slot means to maintain said sealing head at a preselected temperature, said passage means including first and second air distribution manifolds each extending substantially the entire length of said sealing head, an air inlet passage leading from the exterior of said sealing head to said first manifold for receiving said hot air, a plurality of spaced distribution passageways leading form said first manifold to said second manifold, and a plurality of exit passageways leading from said second manifold to said exit slot means for delivering said hot air to said exit slot means, said exit slot means being located to direct hot air under pressure downwardly from and along the longitudinal length of said sealing head into said welding gap and toward a region of said first and second webs within said welding gap to press said webs together, said hot air being reflected generally upwardly by said webs toward and against the outer surface of said tapered lower portion of said head to deflect said air outwardly and away from said head, whereby said hot air strikes said webs in a narrow, generally linear pattern extending the length of said head to continuously weld said webs together along a narrow weld line as said webs pass through said welding gap, said narrow pattern preventing overheating of said webs in regions adjacent said welding gap.

6. The apparatus of claim 5, wherein said means supplying hot air under pressure includes a supply tube connected to said inlet passage, and heater means within said supply tube for heating the air supplied to said sealing head.

7. The apparatus of claim 6, further including temperature control means connected to said heater means.

8. The apparatus of claim 7, further including temperature sensing means responsive to the temperature of the air being supplied to said exit slot.

9. The apparatus of claim 6, wherein said air is supplied to said inlet passage at a pressure of about 30–40 psi, and wherein said air passage means are dimensioned to provide an air flow of between about 15 and 30 CFM.

10. The apparatus of claim 9, wherein said air temperature is maintained between about 600°–800° F. for a web moving at about 65-70 ft/min. longitudinally through said sealing gap.

11. The apparatus of claim 5, wherein said slot means is continuous.

12. The apparatus of claim 5, wherein said slot means is a continuous slot segmented by support studs between adjacent slotted passageways.

13. Apparatus for securing a first web of plastic material to a second web, comprising:
platen means having a curved upper surface with a selected radius of curvature;
at least one elongated sealing head positionable above said platen means to define a welding station, said sealing head having opposed exterior side walls extending the length of said head, said side walls including lower wall portions having elongated bottom edges, the lower wall portions tapering downwardly and inwardly to define an elongated, curved lower edge and to form an elongated lower sealing head portion which is generally wedge-shaped in cross-section;
means for moving said sealing head into a position wherein said curved lower edge is closely spaced from said platen curved upper surface to provide an elongated welding gap therebetween;
means drawing first and second webs longitudinally along said platen curved upper surface through said elongated welding gap, said webs being aligned with and extending the length of said welding gap;
means supplying hot air under pressure and at a preselected, controllable temperature to said sealing head;
passage means within aid sealing head for guiding said air in a tortuous path through said sealing head to maintain said sealing head at a preselected temperature and including narrow, elongated exit slot means formed in and extending along substantially the entire length of said elongated lower edge of said sealing head, said exit slot means including a continuous slot segmented by support studs between adjacent passageways and directing hot air under pressure toward said first and second webs to press said webs together and to continuously weld said webs together along a narrow weld line as said webs pass through said welding gap.

14. The apparatus of claim 13, wherein said first and second webs are of indeterminate length, and wherein said drawing means moves aid webs continuously through said welding gap, said elongated lower edge of said sealing head being aligned with the longitudinal motion of said webs.

15. The apparatus of claim 14, wherein said passage means within said sealing head includes first and second air distribution manifolds each extending substantially the entire length of said sealing head;
an air inlet passage leading from the exterior of said sealing head to said first manifold;
a plurality of spaced distribution passageways leading from said first manifold to said second manifold; and
a plurality of exit passageways leading from said second manifold to said exit slot means.

16. The apparatus of claim 15, wherein said exit slot is about 0.002 inch deep.

17. The apparatus of claim 15, wherein said sealing head includes an elongated body portion having said passage means formed in one surface thereof, and an elongated cover portion coextensive with said body portion and attachable to said one surface to cover said one surface and said passage means.

18. The apparatus of claim 17, wherein said first distribution manifold is about 0.5 inch deep, said second distribution manifold is about 0.25 inch deep, and said distribution passageways are about 0.012 inch deep.

19. The apparatus of claim 13, wherein said platen means includes at least one longitudinally extending groove for receiving and guiding one of said webs through said welding gap.

20. The apparatus of claim 13, including a plurality of substantially identical sealing heads in spaced side-by-side relationship to define said welding station, each said sealing head being movable into positions closely spaced from said platen upper surface to provide a corresponding plurality of welding gaps, means adjustably mounting said heads to vary the spacing therebetween to accommodate webs of different widths, and wherein said means for drawing first and second webs through said welding gap includes means for drawing first and second webs through each of said plurality of welding gaps simultaneously.

21. The apparatus of claim 20, wherein at least one of said webs is common to all of said welding gaps.

22. The apparatus of claim 20, wherein said means adjustably mounting said heads comprises a head carrier frame pivotally mounted for motion with respect to said platen means.

23. The apparatus of claim 22, wherein said head carrier means includes guide bar means mounted on said frame, said heads being slidable on said guide bar means for lateral adjustment with respect to webs on said platen upper surface.

24. The apparatus of claim 1, wherein said exit slot means is located to direct said hot air from said sealing head toward the surface of said first and second webs along the entire longitudinal length of said sealing head, said hot air being reflected from the surface of said webs back toward and against the outer surface of said tapered lower portion of said head to deflect said air outwardly and away from said webs and said head, whereby only a narrow portion of said webs within said gap are heated.

* * * * *